(12) United States Patent
Mosley et al.

(10) Patent No.: US 6,597,197 B1
(45) Date of Patent: Jul. 22, 2003

(54) I2C REPEATER WITH VOLTAGE TRANSLATION

(75) Inventors: Daniel A. Mosley, Hillsboro, OR (US); Michael J. McTague, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,495

(22) Filed: Aug. 27, 1999

(51) Int. Cl.[7] .......................................... H03K 19/0175
(52) U.S. Cl. .............................. 326/63; 326/80; 326/93
(58) Field of Search ......................... 326/62–63, 93–98, 326/80, 81

(56) References Cited

U.S. PATENT DOCUMENTS

| | | | | |
|---|---|---|---|---|
| 4,931,672 A | * | 6/1990 | Khan | 326/78 |
| 5,428,800 A | * | 6/1995 | Hsieh et al. | 326/82 |
| 5,534,812 A | * | 7/1996 | Cao et al. | 327/333 |
| 5,877,633 A | * | 3/1999 | Ng et al. | 326/80 |
| 6,051,989 A | * | 4/2000 | Walck | 326/30 |
| 6,472,903 B1 | * | 10/2002 | Veenstra et al. | 326/38 |

\* cited by examiner

*Primary Examiner*—Don Le
(74) *Attorney, Agent, or Firm*—Blakely, Sokoloff, Taylor & Zafman LLP

(57) ABSTRACT

A bus repeater with voltage conversion and multiplexing circuits for use between devices with incompatible voltage levels communicating over inter-integrated circuit (I2C) buses. Bi-directional data and clock lines are passed through the circuit from one bus to the other, blocked so they are not passed on, or modified before being passed on, depending on the current transaction. The repeater is placed between two separate I2C buses and communicates between the two buses. Separating the two buses in this manner permits each bus to operate at a different voltage. Multiplexing is achieved by including logic in the repeater to recognize a first address associated with the repeater received from the first bus, and pass subsequent addresses and their associated messages through to the second bus to be decoded and processed by the devices on that bus. When the first address is not associated with the repeater, subsequent addresses and their associated messages are ignored and not passed through. To accommodate the slow-slave requirements of an I2C bus, the duration of signals on the clock line may be modified.

18 Claims, 6 Drawing Sheets

I2C REPEATER WITH VOLTAGE TRANSLATION

BACKGROUND OF THE INVENTION

1. Field of the Invention

The invention relates to devices for transferring signals between buses. More particularly, it relates to voltage translation and address multiplexing between different buses.

2. Description of the Related Art

Modern computer systems can permit a variety of memory components to be used in a single computer system. During initialization, the system queries the various memory components to determine their size and configuration, and writes the pertinent information into the appropriate locations for operational use of the memory. This communication is typically performed over a separate bus other than the normal memory bus used for memory read/write operations.

FIG. 1 shows a conventional system. During system initialization, system device 6 communicates over bidirectional serial bus 18 with multiple memory components, which are typically synchronous dynamic random access memories (SDRAM) 16. Each SDRAM includes a serial presence detect (SPD) circuit that receives queries from system device 6, and responds with information on the capacity and other parameters of the SDRAM. The information thus received by the system device is then used to configure the system to accommodate the various sizes and types of memory components that may be present. Once the system has been configured, normal read and write operations to memory take place through a different, higher speed data path (not shown).

Bus 18 is typically an inter-integrated circuit bus, frequently referred to as an $I^2C$ or I2C bus. This is a well-known two-line serial bus with a bi-directional serial data line and a bi-directional clock line. I2C protocol follows a master-slave format, with the master device initiating a transaction and specifying the address of the designated slave device, and the designated slave device responding to it. I2C protocol is fairly simple, with a five-part format: 1) A start bit to initiate a transaction, 2) an address byte, with seven bits denoting the address and the eighth bit denoting a read or write command, 3) data bytes, 4) an acknowledge bit following each 8-bit address or data byte, and 5) a stop bit to terminate the transaction. During the transmission of address and data bits, the data line may change only while the clock line is low. If the data line changes while the clock line is high, this signifies one of two commands: 1) a falling data signal from the master is a START command, and 2) a rising data signal from the master is a STOP command. An ACKNOWLEDGE response from the slave is indicated during an acknowledge bit when the slave pulls the data line low while the clock line is low, and keeps the data line low while the clock line is high. Failure of the slave to pull the data line low during the acknowledge bit is a non-acknowledgment condition and the master will abort the transfer with a stop bit. I2C protocol also allows a slow slave device to make the clock line wait for it. When a responding slave device sees the clock line pulled low, it can also drive the clock line low until it is ready to receive the next clock pulse. This period will normally be less than the period in which the master is driving the clock low (i.e., 4.7 microseconds minimum), and will therefore have no effect. But in the event the slave keeps the line low for longer than this period, the clock line will remain low even after the master device ceases driving it low. When this happens, the master device recognizes this condition as a delay by a slow slave, and delays the start of the next clock cycle until the slave releases the clock line, allowing it to go high.

Memory components such as SDRAMs 16 are typically designed to interface the I2C bus with 3.3 volt logic. However, many system devices now incorporate logic circuits using 1.8 volt logic levels, and can suffer damage if exposed to voltages in excess of about 2.2 volts. Thus, connecting these 1.8 volt system devices directly to a standard 3.3 volt SDRAM through an I2C bus can result in damage to the system device's interface circuitry.

In addition to the above problems, limited addressability is also a problem. Although the I2C protocol provides seven address bits, four bits are usually pre-assigned for specific memory types and the remaining three bits can only address eight individual SDRAMs. Eight memory components is seldom enough.

SUMMARY OF THE INVENTION

An apparatus of the invention includes a first bidirectional data port operable at a first signal voltage level, and a second bidirectional data port operable at a second signal voltage level which may be different than the first signal voltage level. The apparatus also includes a first bidirectional clock port operable at the first signal voltage level and a second bidirectional clock port operable at the second signal voltage level. The apparatus further includes a system control circuit coupled to the first and second data ports and to the first and second clock ports. The first data and clock ports can communicate with a first serial bus and the second data and clock ports can communicate with a second serial bus.

A method of the invention for transferring bus signals between buses may include selectively and non-simultaneously performing each of the steps of a) repeating a clock signal from the first clock line to the second clock line and repeating a first data signal from the first data line to the second data line, b) repeating the clock signal from the first clock line to the second clock line and repeating a second data signal from the second data line to the first data line, and c) preventing the clock and data signals from the first clock and data lines from repeating on the second clock and data lines.

DETAILED DESCRIPTION OF THE INVENTION

Figure 1:
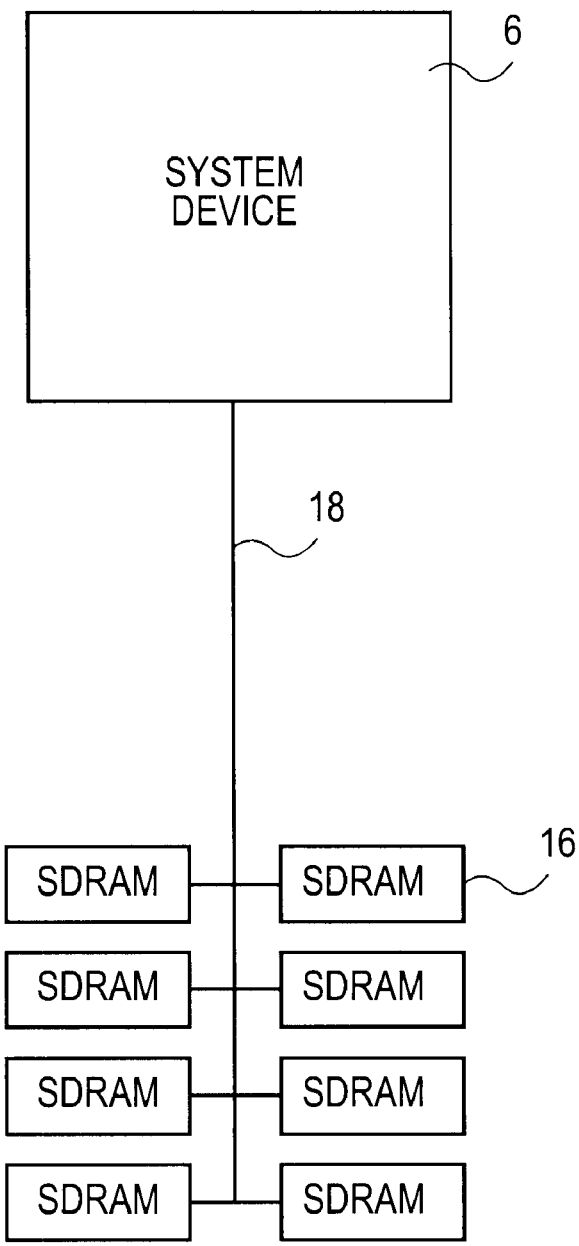
FIG. 1 shows a prior art system for communicating between a system device and various memory components.
Figure 2:
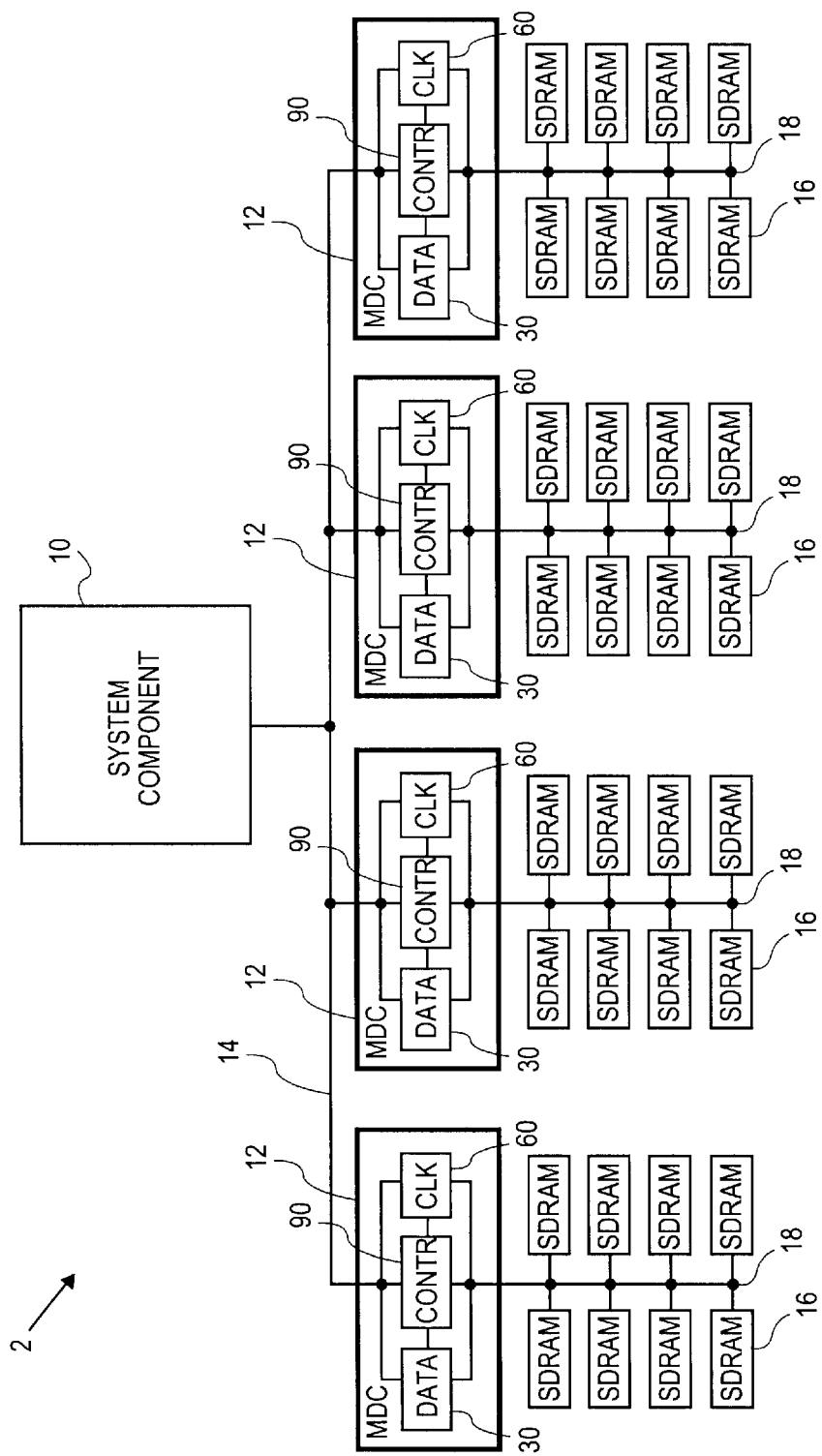
FIG. 2 shows a system of the present invention for communicating between a system component and various memory components.

FIG. 2 shows a system 2 of the present invention. System component 10 initiates communications with multiple memory data components (MDC) 12 over bus 14. System component 10 may have various forms. For instance, it might be an integrated circuit dedicated to the functions described herein, or it might be a processor which also performs many other functions. Each MDC 12 can communicate over its respective bus 18 with any device 16 connected to that bus, such as synchronous dynamic random access memories (SDRAM). In one embodiment, bus 18 and SDRAMs 16 can be the same devices shown in the prior art of FIG. 1. The voltage used on bus 14 should be chosen for compatibility with system component 10, such as 1.8 volts. The voltage used on bus 18 should be chosen for compatibility with memory components 16, such as 3.3 volts. FIG. 2 shows four NDCs 12, with eight SDRAMs 16 per MDC, although other quantities can also be used. Buses 14 and 18 can both be I2C buses. In one embodiment, each MDC 12 can perform several functions, including 1) voltage translation between bus 14 and bus 18, 2) multiplexing of address data between bus 14 and bus 18, and 3) manipulation of the clock line between bus 14 and bus 18 to accommodate slow slave devices. Each MDC can function as a repeater by receiving logic signals on one bus and duplicating those logic signals on the other bus, even if each bus operates at a different voltage level. Each MDC has a data circuit 30 for processing the data signals, a clock circuit 60 for processing the clock signals, and a control circuit 90 for providing overall control of the MDC. In the embodiment shown in FIG. 2, each MDC is identical except for its bus address on bus 14.

Figure 3:
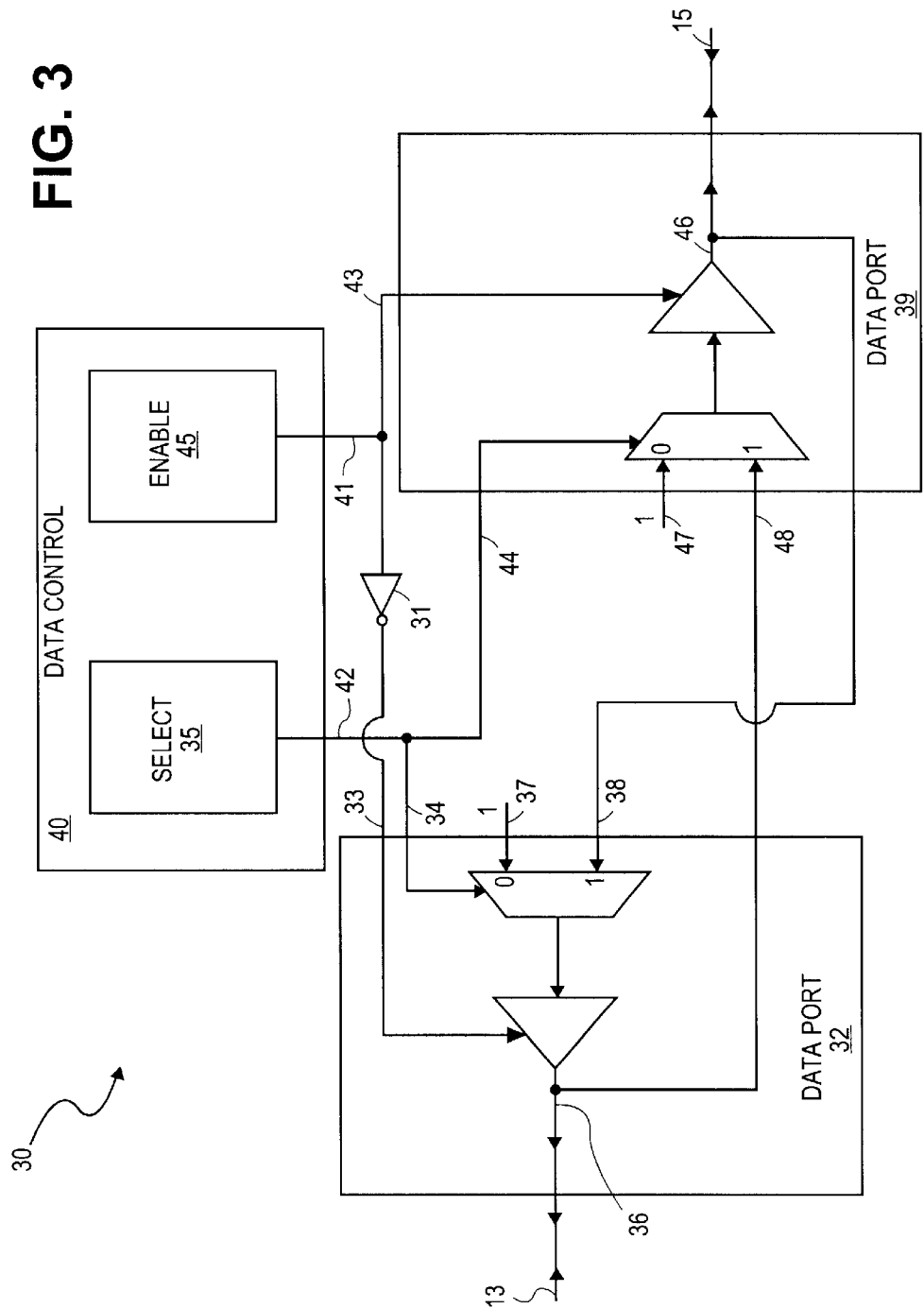
FIG. 3 shows a logic diagram of a repeater circuit for a data line.
Figure 5:
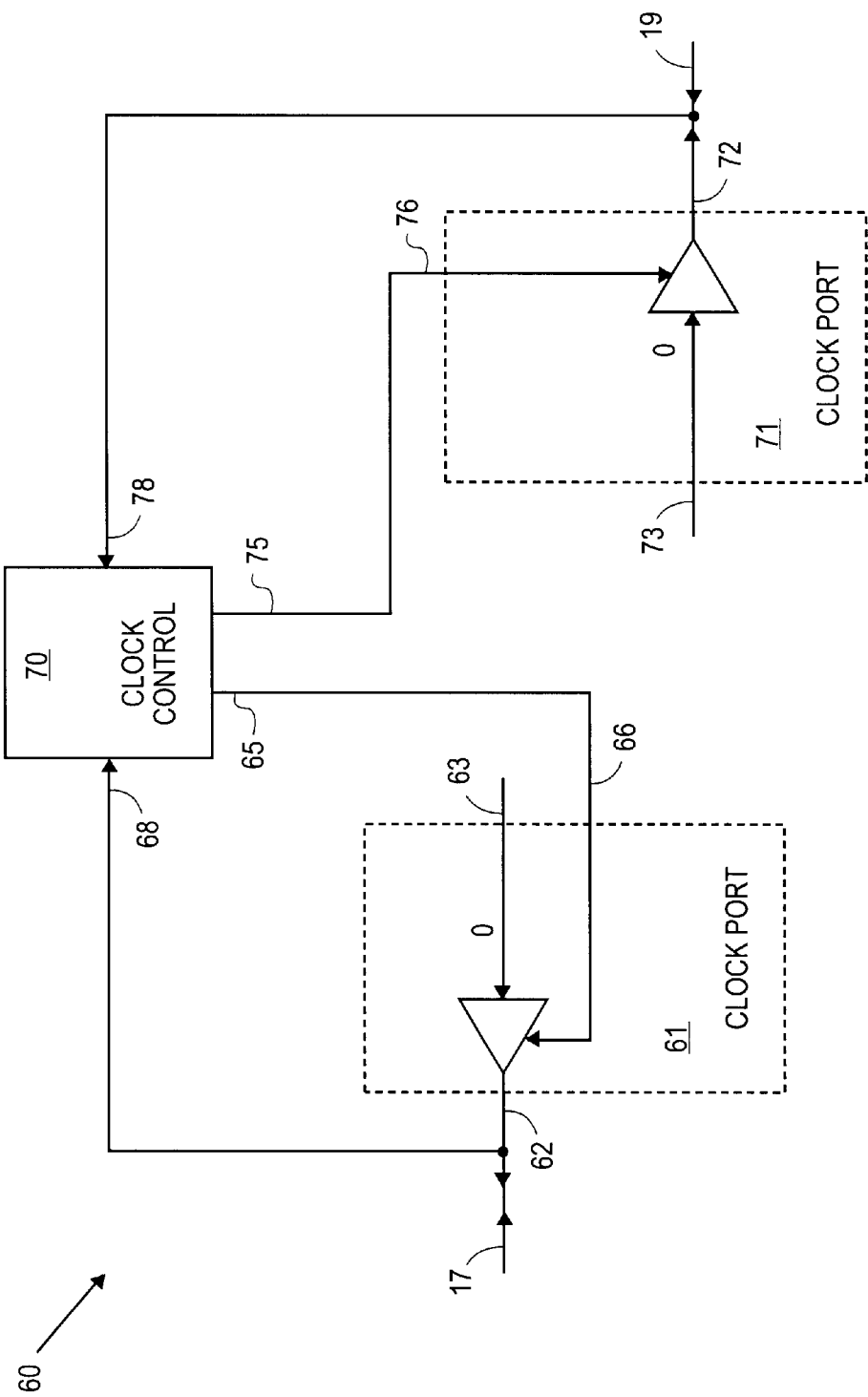
FIG. 5 shows a logic diagram of a repeater circuit for a clock line.

FIG. 3 shows a circuit 30 for processing data signals SDA for an I2C bus, while FIG. 5 shows a circuit 60 for processing clock signals SCL for an I2C bus. Bus 14 contains a bidirectional data line 13 and a bidirectional clock line 17. Bus 18 contains a bidirectional data line 15 and a bidirectional clock line 19.

FIG. 3 shows a data circuit 30 for processing the signals between data line 13 of bus 14 and data line 15 of bus 18. Data port 32 includes a line driver output 36 coupled to data line 13, a line driver input 37 which is coupled to a predetermined logic level, and a line driver input 38 which is coupled to data line 15. Selector input 34 can select either of inputs 37 or 38, depending on the logic state presented to selector input 34. Enable input 33 can be used to enable the selected input to be fed to output 36, or to disable output 36 so that neither input is fed to output 36, again depending on the logic state presented to enable input 33. Data port 39 provides a similar circuit for connection to data line 15, with line driver output 46 coupled to data line 15, a line driver input 47 coupled to a predetermined logic level, and a line driver input 48 coupled to data line 13. Selector input 44 can select either of inputs 47 or 48, depending on the logic state presented to selector input 44. Enable input 43 can be used to enable the selected input to be fed to output 46, or to disable output 46 so that neither input is fed to output 46, depending on the logic state presented to enable input 43. Data ports 32 and 39 are shown to contain a two-input multiplexer and a line driver. These are shown to illustrate internal functionality, and should not be read as a requirement for a specific internal circuit design.

Data control circuit 40 may include selector circuit 35 with selector output 42 coupled to selector inputs 34 and 44, and enable circuit 45 with enable output 41 coupled to enable inputs 33 and 43. Enable input 33 and 43 are presented with opposite logic states for enabling only one data port at a time. Inverter 31 provides this inverse relationship, and can be located in any of circuits 32, 39, 40, or can be located externally to all of them as shown.

In operation, enable circuit 45 can enable output 46 for possible data transfer from data line 13 to data line 15, or it can enable output 36 for possible data transfer in the opposite direction. At the same time, selector circuit 35 can select inputs 38 and 48 for data transfer in the enabled direction, or it can select inputs 37 and 47 to prevent data transfer in either direction, effectively isolating the two buses from one another. Enable circuit 45 can use the read/write bit of an address word to determine which direction to enable.

If circuit 30 interfaces with buses operating at two different voltage levels, circuit 30 may include both voltage levels within the circuit, so that outputs 36 and 46 may each be biased with the appropriate voltage level for the affected bus. Using the inverse logic that is common on shared buses, a logic 1 may be indicated by a low voltage while a logic 0 may be indicated by a high voltage. In this configuration, the line is normally driven to a high state by all devices on that line, or alternatively is allowed to be pulled high by an external biasing device. The line will go low only if one or more of the devices on the line drives it low. When those devices release the line by ceasing to drive it low, the line returns to a to a high state as a logic 0. In one embodiment, low is represented by signal ground, while high is represented by either 1.8 volts or 3.3 volts depending on which bus is being described. Thus a line will be driven to a logic 1 if any device on the bus drives the line low to signal ground, but will return to high only if all devices release the line by attempting to drive it high, indicating a logic 0. This convention is assumed in all the examples described herein for both data and clock lines. However, other variations may also be used for both voltage levels and logic assignments, and these variations are known to those of skill in the art. The invention includes such variations.

Figure 4:
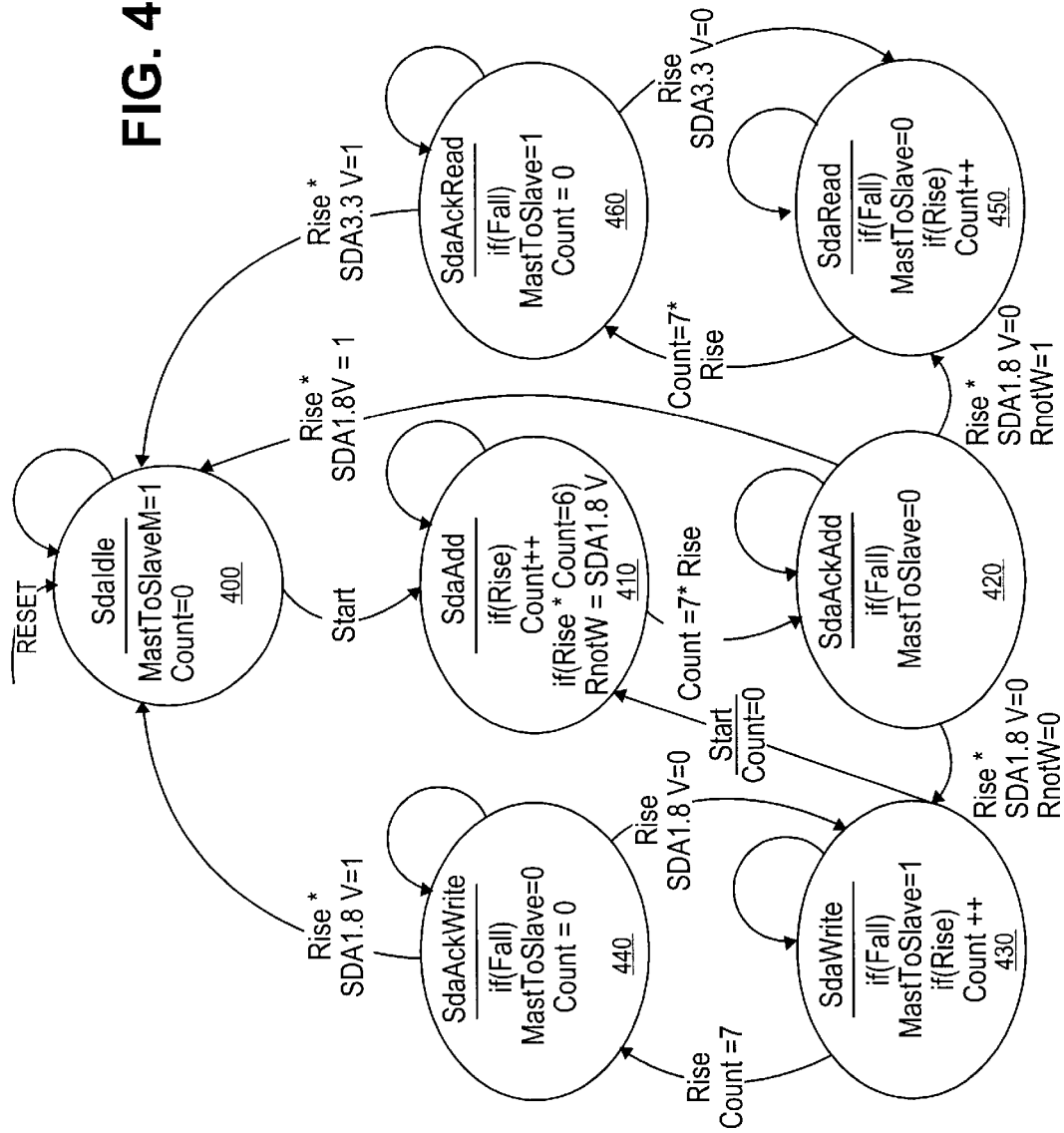
FIG. 4 shows a state diagram for a data circuit state machine.

In one embodiment, enable circuit 45 for data line control includes a state machine. FIG. 4 shows a state diagram for its operation. As can be seen, the state machine idles at step 400 until it receives a START bit from a master device such as system component 10. At step 410 it reads in the address byte. If it does not recognize its own address at step 420, it returns to step 400. If it does see its own address, it decodes the read/write bit and branches to step 430 for a write or step 450 for a read. If a write, it receives and stores each data byte written from the master at step 430, sends an ACKNOWLEDGE bit at step 440, and loops back to step 430. If a read command has been decoded, the state machine follows a similar looping path through steps 450 and 460, writing data to the master and acknowledging each byte. Whenever a STOP command is received, the state machine is reset and forced back to step 400.

FIG. 5 shows a clock circuit 60 for processing the signals between clock line 17 of bus 14 and clock line 19 of bus 18. Clock port 61 includes a line driver output 62 coupled to clock line 17, and a line driver input 63 which is held at a predetermined logic level. Enable input 66 can be used to enable the input signal at input 63 to be fed to output 62, or to disable output 62, depending on the logic state presented to enable input 66. Clock port 71 may provide a similar circuit for connection to clock line 19, with line driver output 72 coupled to clock line 19, and line driver input 73 held at a predetermined logic level. Enable input 76 can be used to enable the input signal at input 73 to be fed to output 72, or to disable output 72, depending on the logic state presented to enable input 76.

Clock control circuit 70 includes enable output 65 coupled to enable input 66 and enable output 75 coupled to enable input 76. It also has an input 68 coupled to clock line 17 and an input 78 coupled to clock line 19.

In operation, clock control circuit 70 may independently drive either or both outputs 62 and 72 low by enabling the associated line driver with enable inputs 66 or 76, or it may independently allow either or both outputs 62 and 72 to go high. Since clock control circuit 70 can sense the state of both clock lines 17 and 19, it may repeat the clock signal from one bus to the other in either direction, it may block the transfer of the clock signal in either direction, or it may independently generate a clock signal on either or both clock lines if programmed to do so, depending on the current function being performed.

As with data circuit 30, if circuit 60 interfaces with buses at two different voltage levels, circuit 60 can have both voltage levels within the circuit, and outputs 62, 72 will each be biased with the appropriate voltage level for the affected bus.

Figure 6:
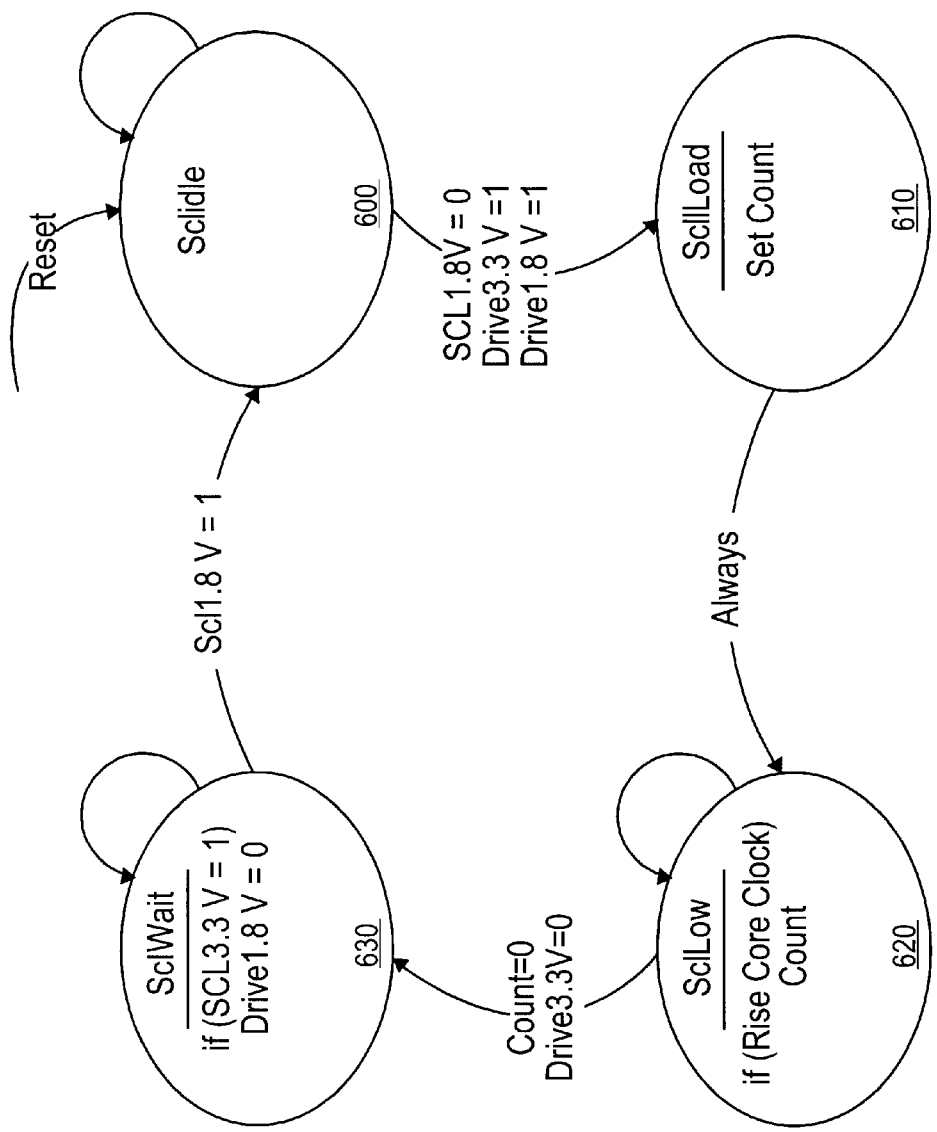
FIG. 6 shows a state diagram for a clock circuit state machine.

In a preferred embodiment, clock control circuit 70 includes a state machine. FIG. 6 shows a state diagram of its operation. The action labels in FIG. 6 show logic conditions rather than voltages, and follow the inverse logic convention previously described (i.e., 'Drive3.3V=1' means line 19 to the 3.3 volt slave device is driven low, which is a logic 1). The state machine initially loops at step 600 in an idle condition. When an input from a master device (shown as SCL1.8V from system component 10) goes low, the state machine goes to step 610 by driving both line 17 and line 19 low. This has no effect on line 17, which is already low, but initiates a low signal to the slave device on line 19, thus passing the low clock signal from master to slave. Following the I2C protocol, the affected slave device can, if so configured, respond to this by also driving line 19 low until it is ready to receive the next clock signal. At this point, the operation of the state machine is not affected by the slave's response, so the state diagram does not indicate this condition. At step 610, a time-out counter is loaded and the state machine advances to step 620, where it waits for the counter to time out. The counter should be set to time out in no more than the period of time the clock line will be held low by the master, which is a minimum of 4.7 microseconds under the I2C standards. In one embodiment, the I2C bus clock runs at 100 KHz with a 50% duty cycle, holding the clock line low for 5 microseconds. When the counter times out, the state machine advances to step 630 by releasing line 19 to the slave, allowing line 19 to go high (logic 0). What happens at step 630 depends on what the slave device is doing. If the slave device has completed its internal processing and released the line (stopped driving it low), then line 19 will be high and the state machine will release line 17 to the master. In most cases, the master will continue to hold line 17 low another 0.3 micro-seconds until it completes the 5 micro-second low period of the clock signal (assuming the above 100 KHz clock). The state machine then advances to step 600 to restart the process. However, if the slave device has not completed its internal processing, it indicates a slow-slave condition by continuing to hold line 19 low. In this case, the state machine will continue to hold line 17 low to the master until the slave releases line 19. When the master device releases clock line 17 but sees it is still being held low, the master recognizes this as the slow-slave condition, and delays further clocked operations until it sees clock line 17 go high, indicating the slave has completed its processing. In this manner, the state machine can pass a normal clock signal from master to slave, and can also pass a slow-slave signal from slave to master.

The invention can also function as a multiplexer to permit more than 8 SDRAMS to be addressed with the 3 address bits available for this purpose. As shown in FIG. 1, multiple MDCs 12 may be connected to bus 14. When system component 10 sends out a seven bit address, the first five bits can be used to specify that this is a multiplexer command to select one of the four MDCs 12, while the remaining two bits can specify which of the four MDCs is being selected. The read/write bit should specify a write command. The following two data bytes then contain 1) the 8-bit address location within the selected MDC 12 that is to be written to, and 2) the data byte to be written into that location. A specified bit (the enable bit) in the second byte can be used to enable the MDC for passing subsequent messages through to the associated SDRAMs, or to any other devices on the associated secondary bus 18. An I2C STOP command then terminates this setup sequence. Following the setup sequence, any subsequent messages that are addressed to devices on bus 18 will be passed directly through to bus 18, where the addressed device can respond with appropriate signals that are passed back through MDC 12 to system component 10. When system component 10 is finished communicating with the SDRAMs tied to a particular MDC 12, system component 10 addresses a second message to the selected MDC, following the format of the setup sequence but resetting the enable bit to tell the MDC the session is at an end and to stop passing messages through to its secondary bus 18. Then the entire process can be repeated by addressing a different MDC and its associated SDRAMs. During any given sequence, only one MDC at a time should have its secondary bus selected in this manner, with the non-selected MDCs ignoring all data traffic directed to secondary buses 18. However, other types of messages directed to the MDCs may continue during the sequence, as long as they do not enable other secondary buses. In the foregoing manner, up to four MDCs may function as a distributed multiplexer, increasing the addressable SDRAMs or other devices from eight to thirty two.

By incorporating the aforementioned features, each MDC may function as a voltage translator, an address multiplexer, and an intermediate slow-slave clock regulation device. All these functions may be placed on a single integrated circuit, thus reducing the cost, size, complexity, and power dissipation of a system.

The foregoing description is intended to be illustrative and not limiting. Other variations will occur to those of skill in the art. Such variations are intended to be included in the invention, which is limited only by the scope of the appended claims.

We claim:

1. An apparatus comprising:
   a first bidirectional data port operable at a first signal voltage level;
   a second bi-directional data port operable at a second signal voltage level different than said first signal voltage level;
   a first bi-directional clock port operable at said first signal voltage level;
   a second bidirectional clock port operable at said second signal voltage level;
   a data control circuit coupled to said first and second data ports; and
   a clock control circuit coupled to said first and second clock ports.

2. The apparatus of claim 1, wherein said first voltage level is about 1.8 volts and said second voltage level is about 3.3 volts.

3. The apparatus of claim 1, wherein said data control circuit and said clock control circuit are adapted for controlling communication through said first and second data ports and said first and second clock ports using an inter-integrated circuit protocol.

4. The apparatus of claim 1, wherein:
said first data port includes:
a first line driver output;
first and second line driver inputs;
a first enable input; and
a first selector input;
said second data port includes:
a second line driver output;
third and fourth line driver inputs;
a second enable input; and
a second selector input;
said data control circuit includes:
a selector output coupled to said first and second selector inputs; and
a data enable output coupled to said first and second enable inputs;
wherein said first line driver output is coupled to said fourth line driver input and
said second line driver output is coupled to said second line driver input;
wherein said first and third line driver inputs are held at a first predetermined logic level.

5. The apparatus of claim 4, wherein:
said selector output has first and second logic states;
said first logic state is operative for selecting said first and third line driver inputs and de-selecting said second and fourth line driver inputs;
said second logic state is operative for selecting said second and fourth line driver inputs and de-selecting said first and third line driver inputs;
said data enable output has third and fourth logic states;
said third logic state is operative for enabling said first line driver output and disabling said second line driver output; and
said fourth logic state is operative for enabling said second line driver output and disabling said first line driver output.

6. The apparatus of claim 4, wherein said data control circuit includes a data enable circuit coupled to said data enable output and a data select circuit coupled to said selector output.

7. The apparatus of claim 6, wherein said data enable circuit includes a state machine.

8. The apparatus of claim 1, wherein:
said first clock port includes a first line driver having:
a first line driver output;
a first line driver input;
a first enable input;
said second clock port includes a fourth line driver having:
a second line driver output;
a second line driver input;
a second enable input; and
said clock control circuit includes:
a first clock enable output coupled to said first enable input;
a second clock enable output coupled to said second enable input;
wherein said first and second line driver inputs are held at a predetermined logic level.

9. The apparatus of claim 8, wherein:
said first clock enable output has first and second logic states, said first logic state operative for enabling said first line driver output and said second logic state operative for disabling said first line driver output;
said second clock enable output has third and fourth logic states, said third logic state operative for enabling said second line driver output and said fourth logic state operative for disabling said second line driver output.

10. The apparatus of claim 8, wherein said clock control circuit includes a state machine.

11. An apparatus comprising:
a first serial bus having a first data line and a first clock line;
a second serial bus having a second data line and a second clock line;
a first circuit having a first bi-directional data port coupled to said first data line and operable at a first signal voltage level and a second bi-directional data port coupled to said second data line and operable at a second signal voltage level different than said first signal voltage level;
a second circuit having a first bi-directional clock port coupled to said first clock line and operable at said first signal voltage level and a second bi-directional clock port coupled to said second clock line and operable at said second signal voltage level;
a data control circuit coupled to said first and second data ports; and
a clock control circuit coupled to said first and second clock ports.

12. The apparatus of claim 11, wherein said first voltage level is about 1.8 volts and said second voltage level is about 3.3 volts.

13. The apparatus of claim 11, wherein said data control circuit and said clock control circuit are adapted for communicating data with an inter-integrated circuit protocol.

14. A method of transferring bus signals between buses, comprising the steps of:
a) repeating a clock signal from a first clock line to a second clock line and repeating a first data signal from a first data line to a second data line;
b) repeating said clock signal from said first clock line to said second clock line and repeating a second data signal from said second data line to said first data line; and
c) preventing said clock signal from repeating on said second clock line and preventing said first data signal from repeating on said second data line;
wherein each of steps a–c are performed selectively and non-simultaneously.

15. The method of claim 14, further comprising the step of using an inter-integrated circuit protocol.

16. The method of claim 14, further comprising the step of operating said first clock line and said first data line at a first signal voltage level and operating said second clock line and said second data line at a second signal voltage level different from said first signal voltage level.

17. A method of communicating, comprising the steps of:
communicating bi-directional signals between first and second inter-integrated circuit buses operating at different voltage levels;
multiplexing inter-integrated circuit addresses between said first and second buses to address more devices than can be directly addressed with available address bits; and
enabling a slow-slave clock response signal in an intermediate device between a master device on said first bus and a slave device on said second bus.

18. The method of claim 17, wherein the steps of communicating, multiplexing and enabling are performed in the same integrated circuit.

* * * * *

UNITED STATES PATENT AND TRADEMARK OFFICE
CERTIFICATE OF CORRECTION

PATENT NO. : 6,597,197 B1 Page 1 of 1
DATED : July 22, 2003
INVENTOR(S) : Mosley et al.

It is certified that error appears in the above-identified patent and that said Letters Patent is hereby corrected as shown below:

<u>Column 3,</u>
Line 11, after the phrase "2 shows four", delete "NDCs" and insert -- MDC's --.

Signed and Sealed this

Second Day of December, 2003

JAMES E. ROGAN
*Director of the United States Patent and Trademark Office*